US010159267B2

(12) United States Patent
Vaz Camara

(10) Patent No.: US 10,159,267 B2
(45) Date of Patent: Dec. 25, 2018

(54) ELECTROMECHANICAL NIXTMALIZATION SYSTEM

(71) Applicant: Eloy Vaz Camara, Distrito Federal (MX)

(72) Inventor: Eloy Vaz Camara, Distrito Federal (MX)

( * ) Notice: Subject to any disclaimer, the term of this patent is extended or adjusted under 35 U.S.C. 154(b) by 716 days.

(21) Appl. No.: 14/422,142

(22) PCT Filed: Aug. 17, 2013

(86) PCT No.: PCT/IB2013/056692
§ 371 (c)(1),
(2) Date: Jun. 24, 2015

(87) PCT Pub. No.: WO2014/027335
PCT Pub. Date: Feb. 20, 2014

(65) Prior Publication Data
US 2015/0296844 A1 Oct. 22, 2015

(30) Foreign Application Priority Data

Aug. 17, 2012 (MX) .................... MX/a/2012/009585
Aug. 16, 2013 (MX) .................... MX/a/2013/009475

(51) Int. Cl.
*A23L 1/10* (2006.01)
*B02B 1/04* (2006.01)
(Continued)

(52) U.S. Cl.
CPC ........... *A23L 1/1033* (2013.01); *A23L 7/1975* (2016.08); *B01F 7/00033* (2013.01);
(Continued)

(58) Field of Classification Search
CPC .................... A47J 27/002; A23L 1/1033
(Continued)

(56) References Cited

U.S. PATENT DOCUMENTS 4,488,817 A 12/1984 Uesaka et al.
4,540,288 A * 9/1985 Pandolfi .................... A23G 9/12
366/145

(Continued)

FOREIGN PATENT DOCUMENTS

ES 402186 A1 3/1975
FR 2776471 A1 10/1999
(Continued)

OTHER PUBLICATIONS

English translation of WO2005036985 to Cummings, Ibarra Carlos published Apr. 2005.*
(Continued)

*Primary Examiner* — Michael Laflame, Jr.
(74) *Attorney, Agent, or Firm* — Polsinelli PC

(57) ABSTRACT

An electromechanical nixtamalization system consisting of a rotary reactor, which turns on a horizontal axis and has a single-piece inner steel container without internal blades. It has resistors, a ceramic fiber layer, and a detachable stainless steel plate, and is fed by the maize grains introduced into an upper receiving hopper, and a cooling vat with a lid; and an interior and intermediate surface, as well as a cooling chamber located between the interior and intermediate walls, coated in a high-pressure polyurethane lining.

6 Claims, 12 Drawing Sheets

(51) Int. Cl.
  *B01F 7/00* (2006.01)
  *B01F 7/16* (2006.01)
  *B01F 11/04* (2006.01)
  *B01F 15/00* (2006.01)
  *B01F 15/02* (2006.01)
  *B01F 15/06* (2006.01)
  *A23L 7/10* (2016.01)

(52) U.S. Cl.
  CPC ...... *B01F 7/00208* (2013.01); *B01F 7/00266* (2013.01); *B01F 7/161* (2013.01); *B01F 11/04* (2013.01); *B01F 15/00785* (2013.01); *B01F 15/0295* (2013.01); *B01F 15/065* (2013.01); *B02B 1/04* (2013.01); *B01F 2015/061* (2013.01)

(58) Field of Classification Search
  USPC ......... 99/337, 343, 403, 408, 415, 417, 447, 99/407, 483, 484, 514; 426/465, 549, 426/622
  See application file for complete search history.

(56) References Cited

U.S. PATENT DOCUMENTS

| | | | |
|---|---|---|---|
| 2006/0177557 A1* | 8/2006 | Rivero-Jimenez | A23L 7/117 426/549 |
| 2008/0051592 A1* | 2/2008 | McNeff | C11C 3/003 554/170 |
| 2009/0142461 A1* | 6/2009 | Meouchi Saade | A23L 7/1975 426/507 |
| 2011/0117259 A1* | 5/2011 | Storek | A47J 36/14 426/509 |
| 2013/0243921 A1* | 9/2013 | Genera | A47J 27/002 426/465 |

FOREIGN PATENT DOCUMENTS

| | | |
|---|---|---|
| GB | 191503895 A | 7/1915 |
| GB | 2302258 A | 1/1997 |
| MD | 387 Y | 6/2011 |
| MX | 2012003179 A | 6/2012 |
| WO | 2005036985 A1 | 4/2005 |
| WO | 2006078153 A1 | 7/2006 |

OTHER PUBLICATIONS

International Search Report and Written Opinion dated Feb. 4, 2014; in Mexican PCT patent application No. PCT/IB2013/056692.
English language International Search Report and Written Opinion dated Feb. 4, 2014; in Mexican PCT patent application No. PCT/IB2013/056692.
International Preliminary Report on Patentability dated Feb. 17, 2015; in Mexican PCT patent application No. PCT/IB2013/056692.
English abstract for MD387; published on Jun. 30, 2011 and retrieved on Mar. 18, 2015.
English abstract for FR2776471; published on Oct. 1, 1999 and retrieved Mar. 18, 2015.
English abstract for GB191503895; published on Jul. 8, 1915 and retrieved Mar. 18, 2015.
English abstract for MX2012003179; published on Jun. 22, 2012 and retrieved Mar. 18, 2015.
English abstract for WO2005036985; published on Apr. 28, 2005 and retrieved Mar. 18, 2015.
English abstract for WO2006078153; published on Jul. 27, 2006 and retrieved Mar. 18, 2015.

\* cited by examiner

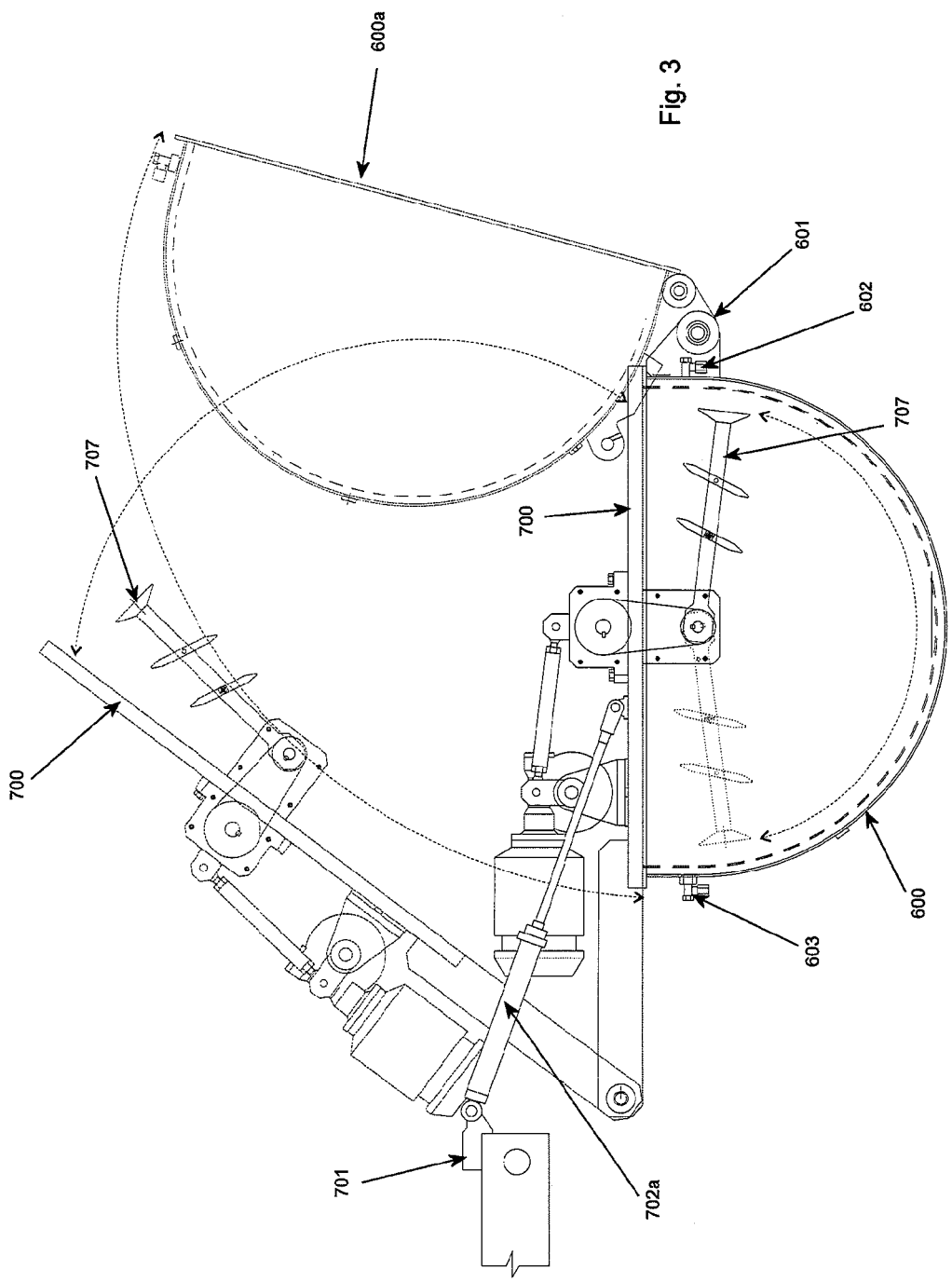

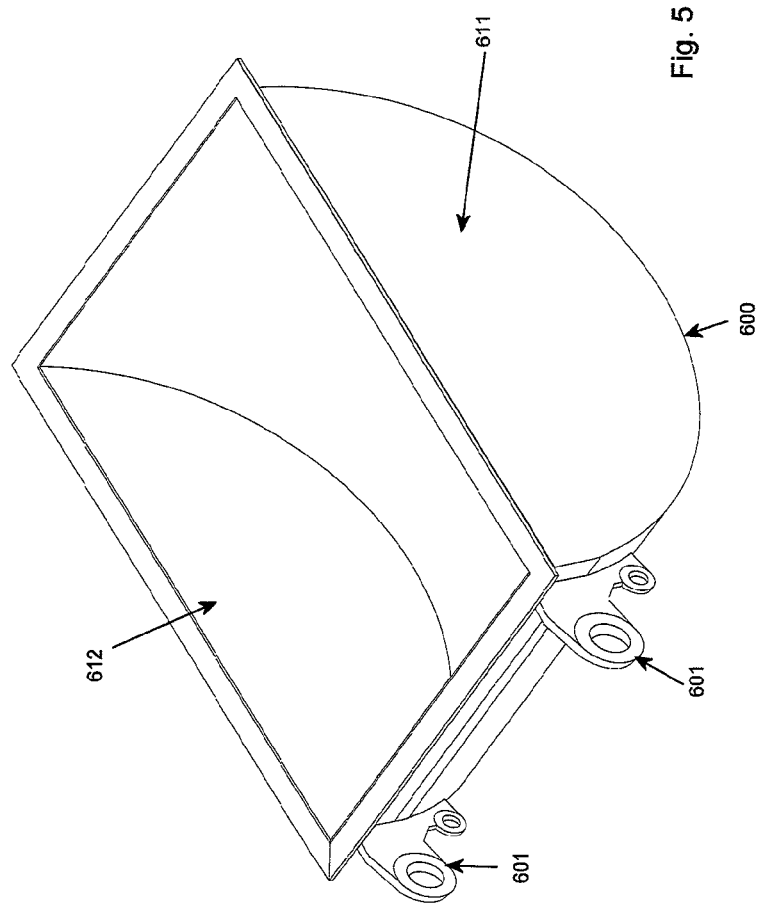

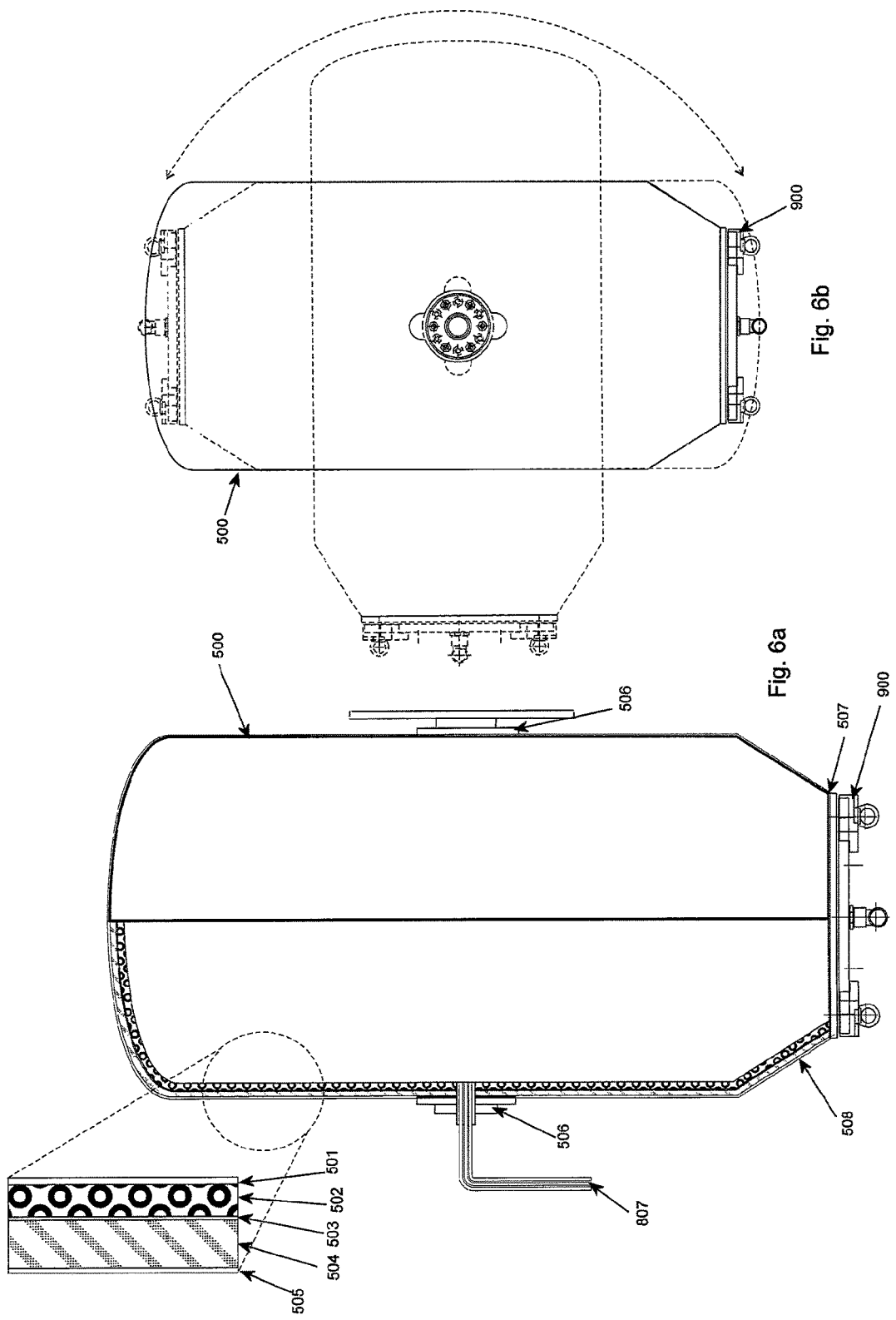

ELECTROMECHANICAL NIXTMALIZATION SYSTEM

FIELD OF THE INVENTION

This invention is an electromechanical nixtamalization system that consists of at least one rotary reactor that swings 180. It includes as a pivot apparatus and cooling system that uses a semicircular tank where the base of the vat is refrigerated by circulating coolant inside a jacket which is walled off by a second exterior casing made of high-pressure polyurethane foam and an agitator propelled by the contact of its silicon palettes sliding along the base in a pivoting motion which maintains distributed contact force with the refrigerated base of the cooling vat until it reaches a temperature of 16 to 20 degrees Centigrade. This is the ideal temperature for producing the maize dough from the nixtamal grounds. Precisely, this invention is a nixtamalization system consisting of a rotary 180-degree reactor which uniformly cooks grains at high pressure and heat. Even more precisely, this system consists of hoppers, a cooling vat, motors, rotary reactor that swings 180 degrees to produce nixtamal ready for grinding in a shorter amount of time and without the discharge of wastewater.

BACKGROUND OF THE INVENTION

Nixtamal has been the basis for the production of maize dough and its byproducts, as maize has been the major grain source in the Mexican diet. To make into dough, it is necessary to cook the partially dried maize grains. Traditionally, the method used was to add a minimum of 2% lime to water a clay pot and cook the mixture, after which time the maize is poured into huge vats and rinsed, a process which produces high amounts of toxic waste water. Once the maize is rinsed, the water drained, producing a high amount of toxic waste water. After having been cooled and rinsed, the grains are then ground. While this traditional method has been sufficient for supplying tortilla factories with maize dough to make tortillas, the tortilla factories, in order to save time and effort, the pots and vats they use are not maintained in proper sanitary conditions, due to various factors in the nixtamal cooking process, which lead to the accumulation of germs and bacteria over time in the large vats, making them hard to clean. Another unsanitary condition is the nejayote (cooking water) which contains lignin (a polymer present in the maize grain's cellular walls). Its basic pH is highly toxic but the wastewater is nevertheless discarded into the drainage system. Traditionally, nixtamal mills use a minimum of 2% lime in large vats of water to ensure that the maize is uniformly cooked (nixtamalization base) to produce the highest-quality nixtamal, but which leads to the disposal of large amounts of nejayote. So, the lack of control mechanisms in the maize mills has led to an industry based largely on price and maize quality speculation, thus influencing the price of tortillas, causing the prices to stagnate rather than lowering costs, while the quality of maize dough has gone down, not to mention the dough's hygienic standards.

Field technicians specialized in grinding and nixtamalifying maize are also familiar with the fact that sacks of maize that arrive to the mill often contain contaminants ranging from maize dust to dead animals, which often go undetected in the large quantities of nixtamal which pass through the mills on a daily basis, contaminants which may be passed on to consumers.

In the current stage of technological development, several large cooking vats have replaced the traditional pots in the nixtamal cooking process. Patent MX292580 is related to the tortilla industry and any new industry requiring the nixtamalization of any of its products. Specifically, this nixtamalization process involves a rotary reactor, and conditioning the grain before it is cooked and left to soak. This conditioning process consists of running the grains through a certain amount of water to hydrate the grain. Although the invention refers to a rotary reactor, this definition does not explain its entire function. Water vapor is also used to hydrate the grain before cooking, a process which uses a lot of energy and requires a large amounts of water, likewise producing more contaminants.

Most modern rotary reactors are laterally revolving concrete vats which require a series of internal blades to agitate its contents. These types of cooking vats have the unfortunate aspect of losing the necessary heat to maintain the nixtamalization process, resulting in a high-cost and inefficient system, as well as requiring large amounts of time and water to wash and sanitize the internal blades.

Systems for obtaining nixtamal are considered suitable for large industries which require cooking large amounts of product and thus necessitate alternative processes to cook maize according to necessary temperature changes, and by introducing water vapor to help hydrate the maize grain.

To understand how nixtamal works, it is necessary to note that it is a Mesoamerican technology: the maize is cooked with a given portion of lime (calcium hydroxide), usually three parts water for every party lime, or a little more if the maize grains are especially hard. Once it is cooked, the grain is preferably soaked overnight, while the soaking time may vary depending on how long the mixture has been cooked, but long enough for the skin to separate from the grain, hydrating the typically tough grain and making the maize easier to grind later. Based on this basic nixtamalization process, a range of byproducts are produced, which have yet to be eliminated from the process.

There are a number of necessary market elements in nixtamal production. In the first place, it is preferable for nixtamal to be in close proximity to tortilla factories, and even more preferable if the tortilla factors or other facilities using nixtamal are in a secure production chain involving grinding the nixtamal, does not take up a lot of space, and eliminates the amount of nejayote discarded. Above all, the production system should be easily and efficiently operated. This allows each point of operation utilizing nixtamalization to improve the quality of its products by eliminating the intermediary (maize mills), which may arbitrarily set the prices of the nixtamal and its byproducts to its own advantage. Technicians familiar with the process know that maize mills traditionally produce nixtamal, grind it, before finally transporting it to the tortilla factories, but that the product has an expiration period of 9 hours, and will be discarded if the product cannot be utilized within that time period. These losses are then directly reflected in the direct sales cost to the consumer. This also leaves the tortilla makers at a disadvantage because they cannot store the dough from the day before, making the tortilla manufacturer dependent on the maize mill's production cycles. In addition to being dependent on mill production, the tortilla makers cannot determine the quality of the dough or the maize used for making the tortillas, and moreover, have little control over the sanitary conditions of the process.

Another disadvantage in terms of transporting the nixtamal and dough is contamination en route, which in turn is passed along to the final consumer.

OBJECTIVES AND ADVANTAGES OF THE INVENTION

The objective of this invention is to provide an electromechanical nixtamalization system consisting of a 180-degree swiveling rotary reactor mounted on to a horizontal shaft.

A second objective of this invention is to provide an electromechanical nixtamalization system consisting of a single-piece rotary 180-degree reactor which spins on a horizontal shaft made up of an internal stainless steel, food-grade aluminum, or ceramic fiber- or Teflon-encased container without internal blades, which has ceramic-fiber-coated resistors and a removable stainless steel plate system.

A third objective of this invention is to provide an electromechanical nixtamalization system where the reactor also has a pair of mouths or hatches on each end of the reactor with a flap to allow it to fill and empty easily.

A fourth objective of this invention is to provide an electromechanical nixtamalization system consisting of a reactor which allows the tortilla factories to make their own nixtamal and dough on-site due to the elimination of nejayote wastewater.

A fifth objective of this invention is to provide an electromechanical nixtamalization system which has the advantage of not requiring large vats to soak the nixtamal as was customarily done in traditional maize mills, subjecting the maize to an immediate cooling process using a system of cooling fluids in a cooling vat which effectively cools the nixtamal faster, preparing the nixtamal in a shorter amount of time to be ground into its final dough product.

A sixth objective of this invention is to provide an electromechanical nixtamalization system which contains cooling components with a removable plates for easy cleaning, allowing the nixtamal to cool evenly in less time and making cleaning and sanitation easier.

A seventh objective of this invention is to provide an electromechanical nixtamalization system that consists of a lower receiving hopper equipped with a hoist, which lifts the grains and transfers them from the receiving hopper to the reactor.

An eight objective of this invention is to provide an electromechanical nixtamalization system that has an optional superior receiving hopper equipped with a suction motor and filter for capturing dust from the maize grains.

A ninth objective of this invention is to provide an electromechanical nixtamalization system that has an optional solar heater and water/lime dispenser, a water/lime capsule dispenser or water/lime capsules.

A tenth objective of this invention is to provide an electromechanical nixtamalization system that consists of a control panel, which comprises all the elements and electrical protections needed to make the system works.

An eleventh objective of this invention is to provide an electromechanical nixtamalization system consisting of a maize unloading system inside the receiving hopper.

A twelfth objective of this invention is to provide an electromechanical nixtamalization system which consists of a rotary reactor that turns on a horizontal shaft.

A thirteenth objective of this invention is to provide an electromechanical nixtamalization system where the reactor is additionally outfitted with a pair of mouths or hatches on both ends to facilitate filling and emptying of the chamber.

A fourteenth objective of this invention is to provide an electromechanical nixtamalization system whose reactor is additionally equipped for taking samples without losing pressure inside the chamber.

BRIEF DESCRIPTION OF THE DIAGRAMS AND FIGURES

A preferred electromechanical nixtamalization system as designed by this invention is described in the following assisted by the subsequent diagrams and figures:

FIG. 3 shows a lateral view of the nixtamal cooling component in various positions.

FIG. 5 shows a perspective view of the inside of the nixtamal cooling component.

FIGS. 6a and 6b show the rotary reactor that spins 180 degrees above a horizontal shaft as designed according to the specifications of the invention.

DETAILED DESCRIPTION OF THE INVENTION

In the present invention an electromechanical nixtamalization system is detailed. It is worth mentioning that this description refers to a series of components that work together to obtain a finished product (nixtamal) by cooking batches of maize grain, continuously producing nixtamal ready for grinding.

While this description refers to a series of components that make up the electromechanical nixtamalization system, some of the components described below are optional, depending on the quality of maize used and the aspects of the location where the system is in operation. Nevertheless, this description includes all parts of the system to provide a better understanding of the advantages of each component.

The electromechanical nixtamalization system consists of a range of components, each with their particular functions, rendering soaking and storage of the nixtamal unnecessary, and making the cooking process much easier and more consistent, allowing production of 50 kg of product per load, or 800 kg of product in an 8-hour workday, making it the ideal solution for tortilla factories. The advantage of producing the nixtamal directly in the factory is that it produces only enough nixtamal as needed for one workday, resulting in a fresher product onsite and eliminating excessive waste water, since the reactor only requires enough water to hydrate the maize grains. Above all, the tortilla factory operator can select the most desirable type of maize grain depending on the type of tortillas ordered, ultimately providing a competitive advantage in final product quality.

Figure 1:
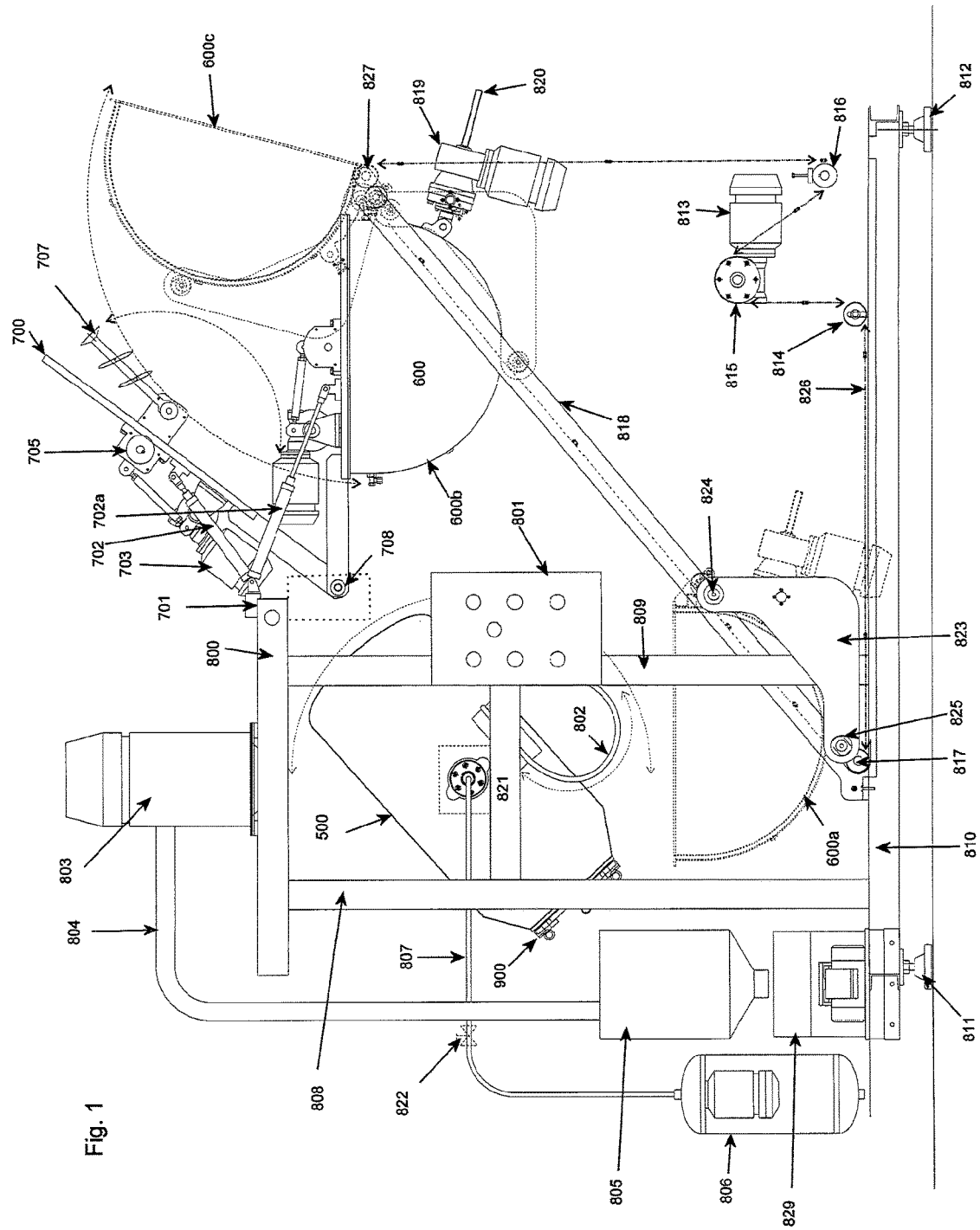
FIG. 1 shows the electromechanical nixtamalization system of this invention.

FIG. 1 shows the electromechanical nixtamalization system. Its functionality is based on a reactor (500) that rotates on a horizontal shaft consisting of layers of materials described in FIG. 6a. The reactor (500) is mounted on a pedestal (800) made up of several bearings (809, 808, 821) constructed out of resistant material capable of supporting the reactor's weight. The reactor (500) is coated with a lining (900) which hermetically seals the reactor to retain the pressure. Once it is sealed, pressure enters the reactor through a pressure tank (806) and a pressure tube (807), pressure which allows for the contents to be cooked rapidly, preventing the product inside the reactor (500) from burning from lack of water. In addition, the reactor (500) is connected to several cables (802) which are attached to the reactor along the side leading to the central panel (801). The cables (802) are retractable, as to not interfere with the reactor's movement (500), and are resistant to the reactor's 180-degree rotation. The central panel (801) consists of all the electronic controls necessary to manage the electromechanical nixtamalization system, consisting mostly of connections to sensors located throughout the system to monitor the reactor's (500) temperature, pressure, and optionally humidity. In addition, the panel controls include sensors which track the position of the cooling vat (600), piston (702), and optionally, a sensor which monitors the temperature of the cooling vat (600), allowing the entire nixtamal production process to be completely automated. In addition to capturing information about the status of the entire system, the central panel (801) includes a signal and/or voltage output for the functioning of several system elements. For example, the central panel (801) emits a voltage signal for the heating elements inside the reactor (500). The heating elements are preferably driven by electronic resistors or by any element that generates heat by electric energy. Likewise, the central panel (801) has piston (702) control outputs for the lid (700), a control output for the cooling motor (703), a control output for the pressure valve (822) (which regulates the necessary pressure to correctly cook the grains), a control output for the motor that positions (813) the cooling vat (600), a control output for the shifting motor (819) for the cooling vat (600), a control output for the motor that drives the swinging motion of the reactor (500), and optionally, the control panel has a fill sensor (803). All data is programmed in the control panel to allow synchronized movements of the entire system.

In addition, the central panel (801) has pressure, temperature, and cooking time controls, programmable according to the characteristics of the maize used to cook which vary by region of production. The system has the capacity to adapt to each type of maize based on a cooking table that comes with the equipment.

FIG. 1 also shows a fill system (803), which vacuums the maize up into a filling tube (804) from a lower hopper (829) using a suction system (805). The fill system is optional, but these types of components aid in the serial production process by eliminating manual labor.

In addition, FIG. 1 shows a cooling vat (600) mounted to a sliding reel (818) permitting the cooling vat (600) to move from its lower position (600a) to a raised position (600b), by means of a chain (826) that is driven by a positioning motor (813) and a series of hoists (817, 814, 815, 816, 827). The cooling vat (600) is attached to a lever (823) made out of two axle boxes (825, 824), a system which assists in the shifting of the cooled contents (position (600c)) a grinder (not shown), whose shifting movement is driven by a tipping motor (819) and a shaft (820) which forces the motion in a linear direction by propulsion. In its raised position, the cooling vat (600) is closed with a lid (700) with an agitating cooling motor on top (703) which assists in the agitation of the contents (707) using a motion system (705) which is made up of parts that include gears and cranks that support the movement of the agitator (707). The lid (700) is raised and lowered by its piston (702) which has a pedestal fastened to its terminus (800) by restraints (701). When the lid's piston (702) is in the open position (702a) with the help of the hinge (708) fastened to part of the pedestal (800), it closes the lid. The whole nixtamalization system is mounted onto a base (810) which includes several stabilizing legs (811, 812). Additionally, the system has optional components such as a water and lime dispenser, valves which are controlled by the central panel (801) to measure exact doses of the required ingredients, where the operator can determine the right amount to add at his or her discretion.

The system described above automatically functions as a unit to obtain the finished product, by emptying the maize into the reactor (500) using the fill system (803), filling tube (804), suction system (805) and lower hopper (829) (or by the operator manually filling the reactor with the grains). The reactor (500) is then hermetically sealed with an airtight cap (900) and air pressure injected into the pressure tank (806). If no pressure is detected, an alarm sounds so that the operator can make sure that the cap is properly closed. If there is pressure, the internal resistors in the reactor activate (500) to heat the contents, and the reactor (500) begins to rotate 180 degrees in a pivoting motion for a preset time, which can be programmed at the control panel (801) to occur at varying speeds; however, an oscillation of 30 cycles per minute is the preferred setting because it prevents damage to the cables and tubes that are connected to the reactor (500). Once the cooking process is completed (in about 30 minutes) a valve releases the pressure and the nixtamal is emptied into the cooling vat (600a), which then is raised to meet the lid (700); once the vat is sealed (700) coolant is filtered into the vat (600) without touching the nixtamal. The vat begins to agitate, thereby lowering the temperature to a range of 16 to 20 degrees. This cooling phase lasts about 30 minutes, at which time the lid is raised (700) and the contents poured into a grinder (not shown). This process allows a batch of nixtamal to be produced in a half hour. However, this system can be programmed to complete several tasks at once, such as cooking a second batch while the first batch is cooling, permitting uninterrupted production of nixtamal if necessary. All functions are controlled by the central panel (801).

The system's filling component (803) has an optional suction motor and filter; the suction motor can also be augmented to include a pneumatic propulsion system or a conveyer system; the suction motor and the filter work to vacuum up the dust produced by the processing of the maize grain, preventing it from reaching the reactor (500) rotating on a horizontal shaft, allowing for a superior quality cooked nixtamal. It is noteworthy that the valve settings are preferably determined by the central panel (801), which can be used to control the duration of the valve settings depending on the type of maize used; another option are manual valve settings to allow the operator to determine at his or her discretion how long is needed for the valves to release the pressure. Another option allows the lime to be dispensed into the mixture in a solution or in tablets, capsules or powder, which can be done using additional components, which include but are not limited to an automatic powder or tablet dispenser, which can be controlled electronically. Another option is to set the system to receive manual dosages of lime solution or tablets at the operator's own discretion.

Figure 2B:
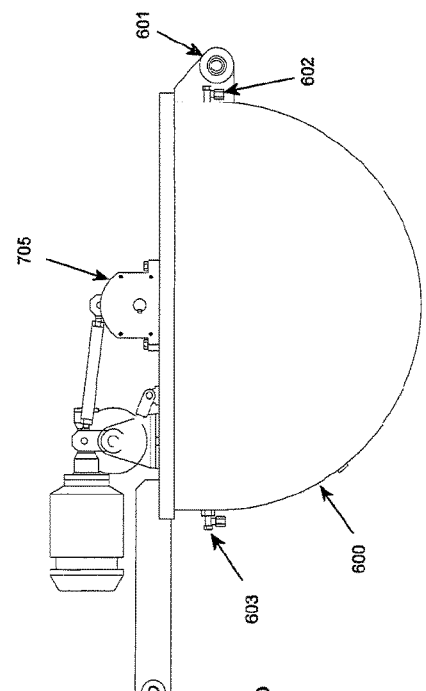
FIGS. 2a and 2b show a lateral view of the nixtamal cooling component according to the invention.
Figure 2A:
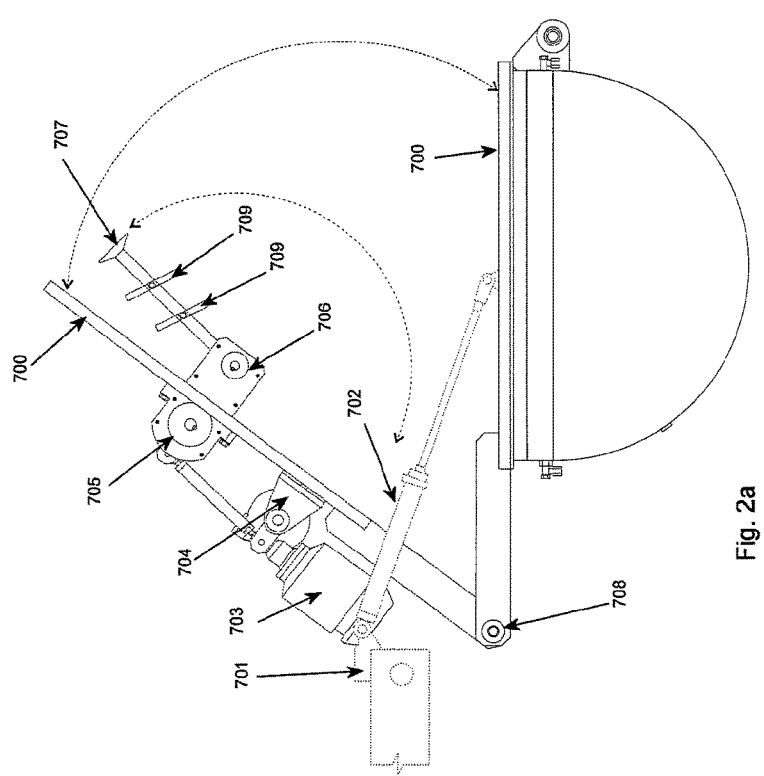

FIGS. 2a, 2b and 3 refer to the cooling vat (600) and the lid (700) in operation in the different positions necessary to cool the nixtamal. Once the cooling vat is filled with hot nixtamal it is raised to meet the lid, which is lowered by a piston (702) to seal the vat with its contents. From its open position the piston (702) reaches a closed position with the help of its hinge (708) which is affixed to a part of the pedestal. At the same time, a cooling fluid is filtered to the vat through an opening (602) and is emptied from the cooling vat (600) through a drain (603). It is worth mentioning that the fluid does not come into contact with the nixtamal, as will be shown in the following. Once the vat is closed, the agitator is activated (707) which has a series of palettes (709) which can be arranged in various ways. The cooling agitator motor (703) located at the base (704) supports the movement of the agitator (707) in a motion system (705). The base of the agitator (706) is made up of parts that include gears and cranks that also contribute to the motion of the agitator (707). The cooling vat (600) is tipped over with the help of lugs (601) that serve as a type of hinge system. In FIG. 3, one can observe the positions of the lid (700) and the cooling vat (600). Notably, when the lid (700) is in the closed position, the agitator (707) moves in a pendulum motion to agitate the nixtamal to be cooled, at the same time forcing the cooling fluid through the opening (602) and out through the drain (603) of the cooling vat (600). Once the nixtamal is cooled, the lid is raised by a piston (702) which is mounted to the pedestal by fasteners (701) and the cooling vat (600) is tipped to position (600a) with the help of the lugs (601).

The lid covers the entire upper surface of the cooling vat (600). The lid (700) has a cooling agitator motor (703) which works by moving at least one agitator (707). In its preferred configuration, this component includes two palettes (709) which serve to move the nixtamal, which has been previously heated to cooking temperature to enable the movement of the palettes (709) by a motion system (705) that includes an agitator base (706) which is detachable for cleaning. The purpose of the system of the lid and vat is to cool the hot nixtamal as quickly as possible to speed up the subsequent grinding process. The lid (700) moves at an angle to the cooling vat (600) when the vat is in its elevated position.

Figure 4B:
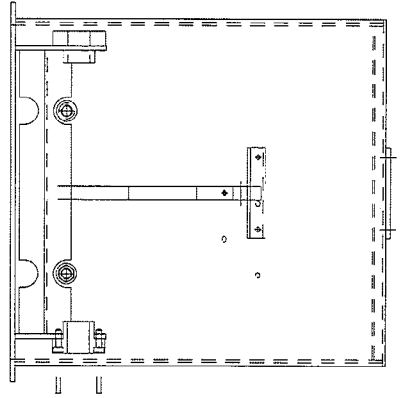
FIGS. 4a, 4b and 4c show the nixtamal cooling component from different perspectives.
Figure 4A:
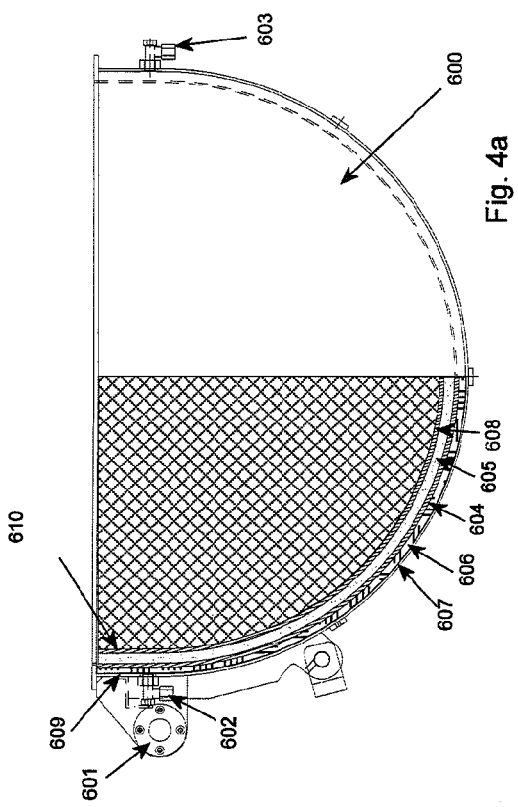
Figure 4C:
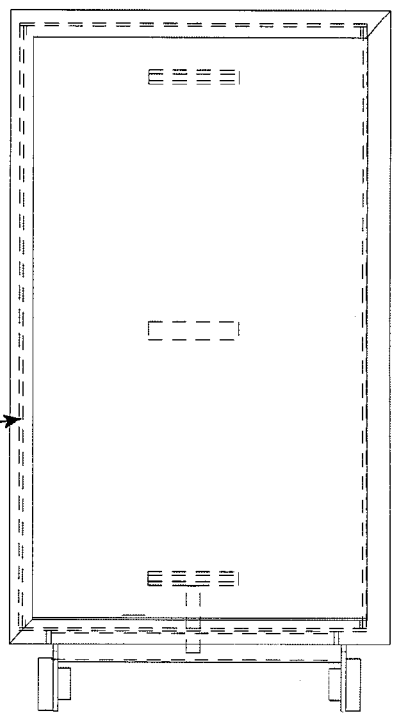

FIGS. 4a, 4b, 4c show the cooling tank (600) in a cross-section depicting the opening (602) and drain (603) which is integrated into the interior surface (608) made of stainless steel or food-grade aluminum. It is noteworthy that it may also have a ceramic or food-grade polymer lining designed to prevent the formation of bacteria on the surface that comes into contact with the nixtamal.

FIG. 4a shows a side view of the nixtamal cooling vat (600) as designed in accordance with the specifications of the invention; the same figure also shows a left side section, while the right side shows a side view of the cooling tank. The cooling vat (600) has a tub formation where its exterior (609) and its interior (610) are preferably lined in its entirely with steel or food-grade aluminum with its interior which comes into contact with the product treated with hard or ceramic food-grade Teflon, or lined with a food-grade anti-corrosive material. Two lugs (601) allow the cooling vat (600) to be tipped to empty its contents; the cooling vat (600) consists of an interior lining (608) and an intermediary contact (604) which preferably are made of the same material as the exterior surface of the cooling vat (607); between the interior surface (608) and intermediary contact (604) is a cooling chamber (605) which preferably covers most of the cooling vat's surface (600), although there is a variation whereby the chamber consists of just a circular portion, avoiding lateral surfaces (611 and 612), whereby the system of the interior surface (608), cooling chamber (605) and intermediary contact (604) is protected by a casing (606) made of high-pressure polyurethane foam, the advantage being that this type of foam has low thermal conductivity, low storage temperature, shortens cooling time, reduces operational costs, is resistant to external blows, is lightweight, and allows flexible cooling of the grains. The cooling vat (600) has all the necessary functionality for allowing a fluid to pass throughout the entire cooling chamber that is equipped with an opening (602) which is functionally attached to an external cooling system which allows the coolant to pass to the chamber (605), while a similar process occurs in the drain (603) which is functionally attached to the external cooling system. The opening (602) and the drain (603) are connected to a cooling system by hoses, and the cooling system can be designed to circulate water, using methods including but not limited to a motor, a source of cold fluid, cooling elements, etc. Alternatively, the cooling chamber may have an internal coil which preferably comes into contact with the internal surface (608) for increased heat transfer in this type of cooling process, where the coolant can circulate to ensure optimum cooling of the nixtamal. Otherwise, the cooling system could consist of a filling and emptying component, by filling the cooling chamber (605) with a low-temperature solution that once has absorbed the heat of the nixtamal, and emptied and refilled until the nixtamal has reached the desirable temperature for grinding. The ideal coolant is a brine solution that complies with food-grade standards. However, other types of fluids can be used in accordance with the specifications of this invention. FIGS. 4b and 4c show lateral and birds-eye views, and FIG. 5 shows the cooling vat from a closer perspective looking in (600).

FIGS. 6a and 6b show the rotary reactor that rotates 180 degrees on a horizontal shaft in accordance with the specifications of the invention (500), which contains heating materials whose principal function works by electrical resistors, and can also be enclosed in a silicon, kapton or mica lining. The reactor (500) on its 180 degree axis on a horizontal shaft has two horizontal exterior shafts (506), whose interior consists of a single steel layer, which does not contain agitators or internal blades, allowing the rotary 180-degree reactor (500) to remain clean once it empties its contents, lessening the probability that germs accumulate for hygienic considerations. The 180-degree rotary reactor (500) on a horizontal axis has all the components necessary to allow the rotation on its horizontal shaft, include parts such as axle boxes, ball bearings, gears, motors, etc. makes use of a motor to drive its 180-degree rotation. The advantage of the 180-degree rotary reactor (500) on a horizontal axis is that the grains inside the 180-degree rotary reactor (500) on its horizontal axis can be uniformly and consistently cooked by the reactor's pivoting motion. An external motor allows the 180-degree rotary reactor (500) to pivot on its horizontal shaft. The motor drives the rotary reactor at any desired speed which can be set in the central control panel (801). In addition, the number of cycles can be programmed in the panel, depending on the characteristics of the maize used. The 180-degree rotary reactor (500) attached to a horizontal shaft, with its rounded cylindrical shape, has the added advantage of preventing the accumulation of sediment in corners, and is free of moving parts such as internal blades. The 180-degree rotary reactor (500) on its horizontal shaft only uses its rotation to tumble the grains of maize as they cook, also preventing residue, making it easier to keep the 180-degree rotary reactor (500) clean and to sanitize it. It is also worth mentioning that air is left inside the reactor to ensure optimal movement and uniform cooking of the grains.

The 180-degree rotary reactor (500) on its horizontal shaft also has a power supply consisting of power sources which include electrical resistors, and can be ordered to optionally include a silicon, kapton, or mica lining, as well as pressure transfer mechanisms from a connecting chamber that contains a compressor. The power supply and pressure transfer consist of a pressure tube (807), and components necessary for transferring the power which include tubes, leads, couplers, etc. The pressure transfer mechanisms are connected to the reactor near the two horizontal exterior shafts (506), while the power supply are usually mounted to the side of the reactor (500). It is worth mentioning that the two horizontal exterior shafts (506) are only connected to the external surface of the reactor (500) and does not go through it. The reactor (500) has a mouth (507) or hatch, whose function changes depending on the position of the reactor during its rotational cycle. In its raised position, the mouth opens to receive the contents to be nixtamalified using the fill system (803), while the nixtamal (cooked maize grains) are emptied through the mouth (507) when the reactor (500) is facing down, allowing the grains to be emptied into the cooling vat (600).

FIG. 6*a* shows the vantage point from the rotary reactor rotating on its horizontal shaft as designed according to the specifications of the invention. The reactor has a rounded cylindrical shape, which allows for more uniform cooking of the grains, preventing them from getting stuck in corners, as well as a balanced rotation. The end of the reactor has a conical shape (508), which is wider near the cylindrical end of the reactor (500) and narrower near its mouth or hatch (507); the conical shape in both ends allows the maize grains inside the reactor to move uniformly during the cooking process as the reactor is turning. Nevertheless, there are other versions of the system design where both ends of the reactor (500) have an identical cylindrical shape, a product that is easier to manufacture.

The reactor (500) consists of a series of parts that are joined by layers of different materials. First, there is an inner steel container (501) which has the same open-ended cylindrical shape as the rest of the reactor as described above and is preferably in one piece without angles or spaces in which bacteria could accumulate and which make cleaning easier. The inner stainless steel container (501) (or of austenitic steel or food-grade aluminum) should consist of an inner hard Teflon, ceramic or food-grade polymer lining for effective heat transport. The advantage of using this type of treatment is that cooking maize and lime (CaO) is a corrosive process for most other materials; the reactor is a single-piece construction derived from casting, smelting or molding techniques, or any other technique resulting in a final construction free of rough internal surfaces and having smooth external surfaces suitable for mounting the resistors. In addition, two molds can be used to design the inner steel container (501) and subsequently welded together using a polish to eliminate imperfections or internal edges.

The next layer has material which contains electrical resistors (502), with options of being lined with silicon, kapton or mica. The inner steal container (501) is lined by at least one layer of resistors which is adjoined to the external surface of the inner steel container (501). This type of resistors has the benefit of being very cost-effective and easier to replace.

It is worth noting that the resistor layer (502) can be taken apart, allowing easy replacement of defective resistors without stopping production entirely.

The resistor layer or each resistor (502) is connected to the electronic control system by serial or parallel ports, or can be connected to each resistor depending on the requirements of each electromechanical nixtamalization system.

The resistor layer or each resistor (502) is connected by high-temperature resistant cables to the electronic control system, which regulates operation times and monitors outages in any part of it. Another option is to connect the resistors to an interrupter with a fuse in case of a power surge.

The inner steel container (501) and the resistor or resistors (502) are insulated by a layer (504), which is separated by an intermediary wall (503), the latter of which is preferably consists of ceramic fiber. The advantage of ceramic material are: its low thermal conductivity, low storage temperature, reduction in energy consumption, reduction in operational costs, resistance to thermal shock, and that it is light-weight as well as permits flexibility in setting the cooking cycles. This type of layer allows the heat to be insulated to permit wasting energy, which also characterizes this product as green. The fiber lines the entire contour of the adjoined inner steel container (501) and the resistors encased in a silicon, kapton, or mica lining to minimize heat loss. Another option in the design is to separate the lining into sections.

The last outer layer consists of detachable stainless steel coatings (505) to allow for easy maintenance of the resistors. Finally, while the outer coating is made of steel, it can nevertheless be replaced by a high-resistant plastic material or any other material that is suitable for protecting the inner layers, due to the high insulating properties of the ceramic fiber. FIG. 6*b* shows how the reactor (500) rotates in 180 degrees. As previously mentioned, the reactor (500) can also be designed in a purely cylindrical form, which is easier to manufacture.

Figure 7B:
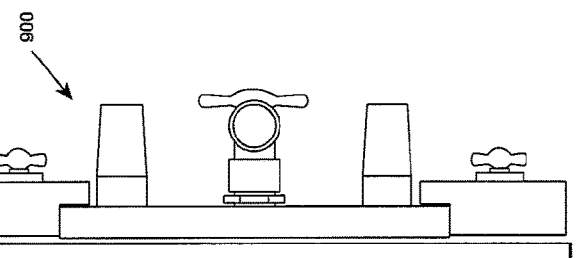
FIGS. 7a and 7b show a view of the lid that is placed on the cooling component.
Figure 7A:
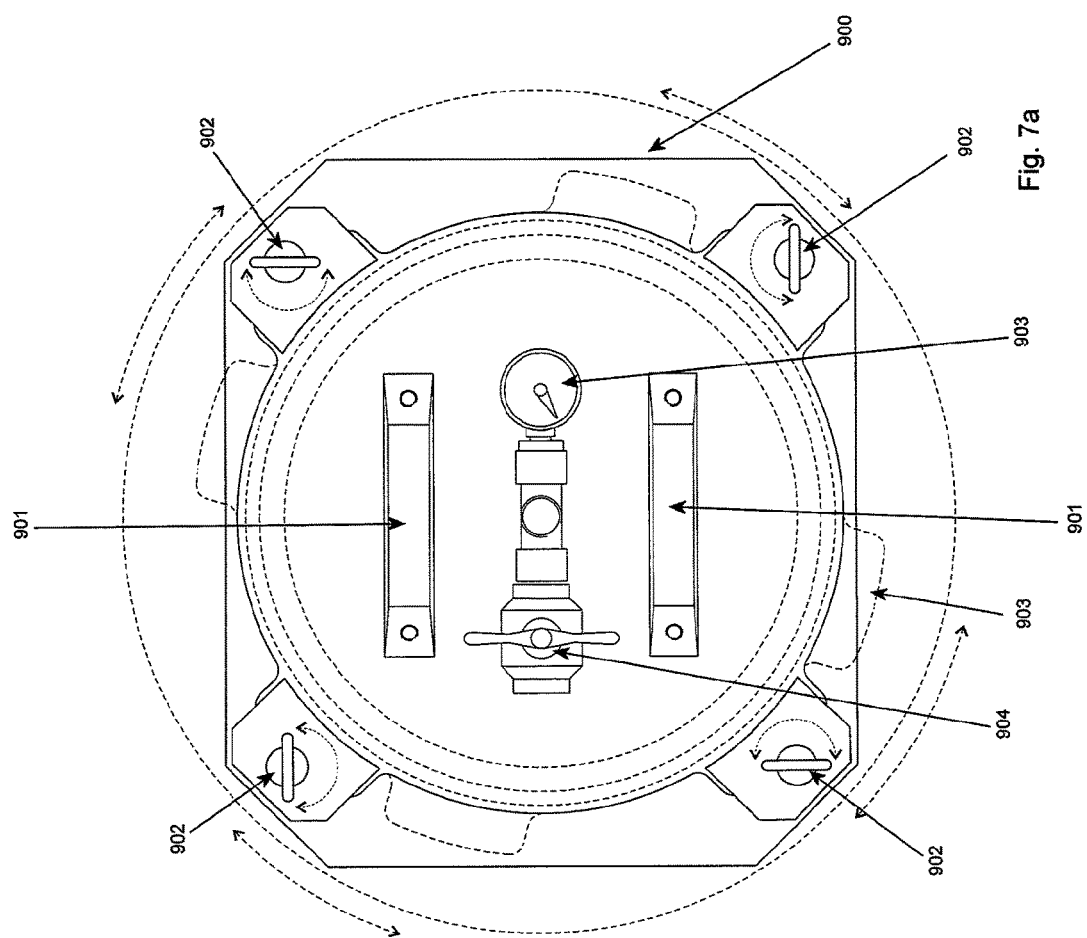

Also as previously discussed, there is a mouth or hatch (507) in one of the ends of the reactor, where the grains are received or emptied. FIGS. 7*a* and 7*b* shows the airtight cap (900) which is designed to maintain constant internal pressure and consists of a pressure valve (904), made up of a hatch attached by a quarter-turn latch with a pressure gauge (903) and half-turn screws (902) to prevent the cap from moving. Finally, it has two handles (901) for attaching and removing the cap; in any case, it is recommended that it is equipped with a seal or high-temperature resistant packing to avoid unintended release of pressure or water leaks.

Figure 8:
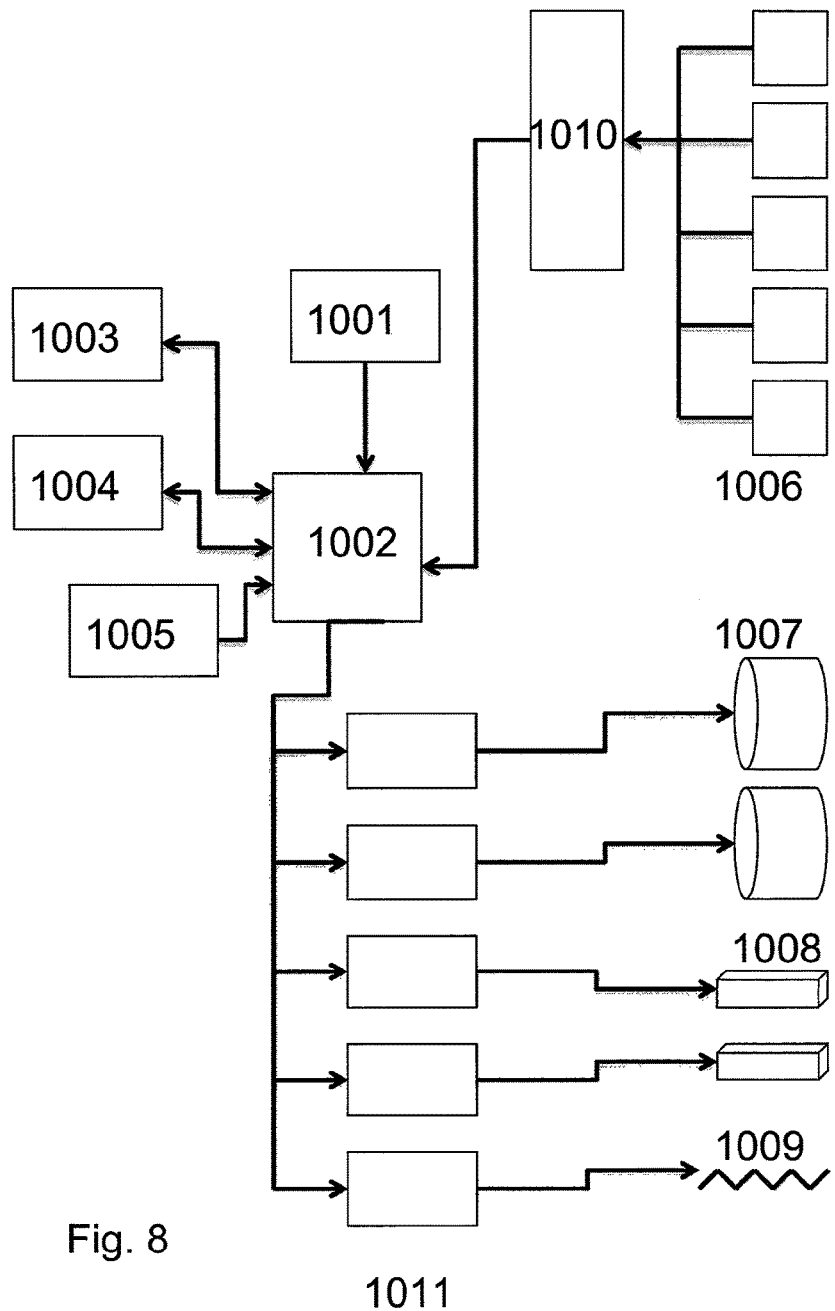
FIG. 8 shows a diagram of the central control panel segments.

FIG. 8 is a diagram of the central control panel (801), which contains a microprocessor (1002) and has a keypad (1005) to confirm settings by the operator based on indicators like: maize hardness, water hardness, room temperature, required pressure, cooking time, amount of water, amount of lime, cooling time. Nevertheless, the microprocessor can be programmed to calculate the amount of water, required pressure and cooking time based solely on the hardness and quantity of maize indicated by the operator and system settings can be made accordingly. A sensor can be placed in the cooling vat (600) to signal the microprocessor (1002) to stop cooling the contents and to empty the cooling vat (600). Movements and operational limits can be stored in a memory (1003) which has all the data necessary for the system's function. The user can monitor the status of the system, errors, remaining times, temperatures, pressure, etc. on the screen. (1001). All signals are sent by the sensors (1006) to an analog-digital converter (1010), which adjusts the signals for processing in the microprocessor (1002). These include sensors that monitor the temperature and pressure of the reactor (500), position of the reactor (500), position of the cooling vat (600), position of its lid (700), and optionally, the temperature of the cooling vat (600), completely automating nixtamal production. Outputs for the heating elements (1009) inside the reactor (500) can also be controlled in the panel. In addition, there are control outputs (1008 and 1009) for the piston (702) of the lid (700), cooling agitator motor (703), pressure valve (822), position motor (813) for the cooling vat (600), tipping motor (819) for the cooling vat (600), output controls for the motor that drives the rotational movement of the reactor (500), and optionally, control signal for the fill system (803) using adapters, relays and actuation systems (1011). All data is programmed in the microprocessor (1002) inside the control panel to the synchronous operation of the entire system.

Figure 9:
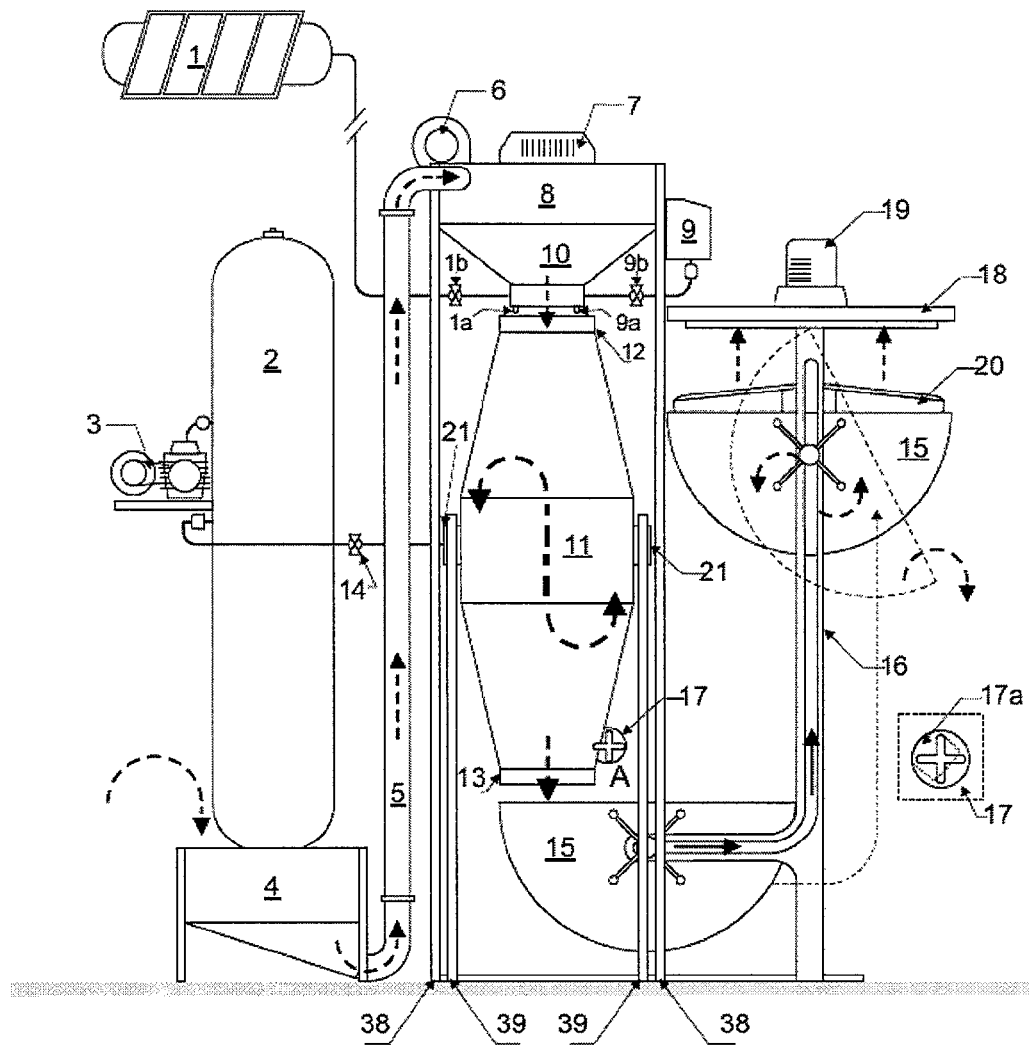
FIG. 9 shows the electromechanical nixtamalization system of this invention.

FIG. 9 shows the electromechanical nixtamalization system as designed according to the specification of this invention. The system is driven by the turning of the rotary reactor on its horizontal shaft (11) which consists of layers of materials described in FIG. 10, which also consists of heating elements whose principle design includes a resistor enclosed in a silicon, kapton or mica lining. The reactor's horizontal shaft (11) consists of two horizontal outer shafts (21) encasing a single one-piece steel layer free of moving parts such as agitators or internal blades, allowing the horizontally-rotating reactor (11) to be easily maintained and cleaned without leaving residue behind after emptying it, reducing the risk of accumulating germs or bacteria for the sake of hygiene. The reactor (11) has all the components necessary to rotate on its horizontal axis. These components include axle boxes, ball bearings, gears, motors, etc. The horizontal rotary reactor (11)'s rotation is driven by a motor. The advantage of a reactor rotating on a horizontal axis (11) is that the grains tumbling inside the reactor can cook uniformly. The horizontally rotating reactor (11) has a motor that can run at a speed set by the operator, and optionally, its rotation cycles can be programmed by the operator depending on the requirements for any given type of maize. In respect to the horizontally rotating reactor (11), its rhombus shape lends to greater movement of the maize grains tumbling inside the reactor on its horizontal axis (11), and the horizontally rotating reactor (11) likewise does not require blades or agitators to stir the grains, since its horizontal rotation is sufficient to keep the maize in motion as it cooks. This prevents sediment or residue from settling inside the reactor after cooking cycles, allowing easier cleaning, maintenance and sanitation of the horizontally rotating reactor (11). It is other noteworthy that an air space inside the reactor also aids in the uniform movement of the maize.

The horizontally rotating reactor (11) has power supply components including a resistor insulated by a silicon, kapton or mica layer, pressure transfer from a connected compartment (2). The power supply and pressure transfer elements that permit the transfer of power include components such as tubes, leads, and couplers. The power supply and pressure transfer elements are connected to the reactor near the two exterior horizontal shafts (21), which are preferably hollow to allow the silicon, kapton or mica encased resistors to be fed to the reactor. It is worth mentioning that the two outer horizontal shafts (21) only run along on the reactor's and does not go through the horizontally rotating reactor (11), the latter of which has two mouths or hatches on both ends (12 and 13), whose function varies depending on the position the reactor is in. FIG. 9 shows the mouth or hatch in one end (12) opening to permit the horizontally rotating reactor (11) to be filled with the grain from the upper receiving hopper (8), while the mouth on the other end (13) releases the already cooked grains (nixtamal) and empties the contents into the cooling vat (15). There is a sampling system (17), which is preferably an airtight scoop, where the maize can be tested to verify how it is progressing in the cooking process. In any case, it should not allow pressure to escape from inside the reactor. Up close, one can observe that the entire sampling unit consists of a hole (17a). The function of the sampling unit (17) is to permit the operator to take a representative sample of the contents inside the reactor to monitor its condition. It is worth mentioning that the sampling system (17) consists of an airtight scoop, which is hermetically sealed off from the reactor unit to prevent pressure from escaping when the simple is taken at the right point in the reactor's rotation cycle.

The upper receiving hopper (8) may also be built to include an optional suction motor (6) and filter (7). The suction motor (6) may be as designed in this invention as a pneumatic propulsion system or a conveyor system. The suction motor (6) and filter (7) vacuums up the dust that the maize gives off so that it does not make it into the horizontally rotating reactor (11), preserving the quality of the nixtamal product. The upper receiving hopper (8) should be large enough and include a lower funnel-shaped section (10) which includes a hatch close to the mouth or receiving hatch of the horizontally rotating reactor (11). This lower portion allows the next batch of dry grains to be stored before loading them into the horizontally rotating reactor (11) when it is ready to ensure utmost efficiency in the process. In the same funnel-shaped lower section (10), a water inlet (1a) can be added, which is controlled by a valve (1b) which receives water from a solar-heated tank (1), providing an ecological and energy-saving advantage. A water/lime drain (9a), controlled by a valve (9b), which receives the solution from a water solution/lime dispenser (9) can also be added to the same lower funnel-shaped compartment (10). It is worth mentioning that the valves are preferably regulated by an electronic control system, where the release times can be programmed according to the requirements of the particular type of maize used. Another option is to activate the valves manually at the tortilla factory operator's discretion. Another option is to dispense the calcium hydroxide solution or calcium oxide in tablets, capsules or power form that allows proper dosage, a component which includes an automatic powder or tablet dispenser regulated by an electronic control system. Still another option would be to dispense the calcium hydroxide or calcium oxide tablets manually at the operator's own discretion.

It is important to mention that the horizontally rotating reactor (11) is mounted on a pedestal (39) which, as previously noted, is built out of a series of components that enable the reactor's horizontal rotation (11). A relief valve regulates the pressure inside the horizontally rotating reactor (11) to prevent the reactor from exploding under excessive pressure. This relief valve can be placed in one of the mouths or hatches on both ends of the reactor (12 and 13), or along the reactor's exterior. Another option is to place an electronic pressure sensor inside the reactor that would send a signal to the system control to switch the system off if excessive pressure is detected. All components in the upper receiving hopper (8) are mounted to a pedestal (38) which affixes the unit during operations.

The upper receiving hopper (8) receives the maize grains from an elevator (5) which is preferably driven by pneumatic propulsion, or otherwise, by a conveyor, unloading or a so-called feed screw system.

The grains are placed into the lower receiving hopper (4), which is in the form of a sieve or a net, preventing the introduction of larger contaminants. The grains are manually placed into the lower receiving hopper (4) and subsequently raised to the upper hopper (8) by an elevator (5).

A piston compressor (3) located inside a connecting compartment (2) is used to introduce pressure, which is gauged by a valve (14), which is preferably regulated by an electronic control system, where the activation of the valve and/or pressure can be timed according to the requirements of the particular type of maize used. Another option is to activate the valve manually at the operator's discretion, in conjunction with a pressure gauge and graduator to prevent the introduction of excessive pressure.

Familiarity with maize is the basic requirement for nixtamalization, as well as knowledge of the technology involved in the process. Each batch of grains has its own characteristics depending on the region it was cultivated and according to environmental factors. This is why each type of maize requires longer or shorter cooking times. These cooking times are typically empirically calculated by mill operator; in other words, the maize is cooked and when the mill operator decides it is done, the water is drained and the nixtamal is cooled. In this invention, however, the maize is cooked under pressure rather than in water, so using the customary empirical method to decide when it is done cooking does not work in this case. Nevertheless, information on the conditions of hardness and humidity for each batch of maize grains cooked using the nixtamalization system presented in this invention can be used to determine a cooking table for the reactor (in case the cooking time cannot be determined by electronic sensors). If there is an electronic sensor for cooking times, the control panel will have a screen, keypad and processor that calculates the cooking times based on the hardness and humidity of the maize grains. If this electronic control system is used to determine the cooking time, the operator only has to introduce the information on hardness and humidity of the grains for the system to program the cooking time. Optionally, a sampling system (17) can be built into the horizontally rotating reactor (11), which is a manual or pneumatic hatch to receive samples and enable the operator to visually monitor the process by sampling the contents taken directly from the horizontally rotating (11). It is worth mentioning that the due to the shape of the reactor and its pressure components and turning action, cooking times are greatly reduced compared to the time it takes to cook the maize grains in the traditional cooking pots, thereby also saving energy. In a reactor system for 25 kg maize loads (the ideal amount for a tortilla factory) approximately 25 liters of water is used (depending on maize quality), whether information about water usage is captured manually or by an electronic system which monitors water consumption based on the hardness and humidity of the maize. The water and lime solution is dispensed into the reactor either manually or electronically controlled, whose timing is likewise determined by information the system receives regarding the hardness and humidity of the maize.

Once the reactor is finished cooking the maize, the hot nixtamal is dispensed from the mouth or hatch on one end (13) and is directly emptied into the cooling vat (15), whose size is compatible with the total amount of cooked product it receives from the horizontally rotating reactor (11), by way of an elevator (16) preferably driven by pneumatic propulsion, or otherwise by an unloader or a so-called feed screw. The cooling vat (15) then transports the nixtamal to the lid (18), which will be further described in FIG. 11. This lid consists of a liquid coolant chamber, a fixed lid and a removable palette motor (19), which drives a silicon blade (20). Once the nixtamal has been cooled, the vat dumps the contents out into a stone grinder.

Figure 10:
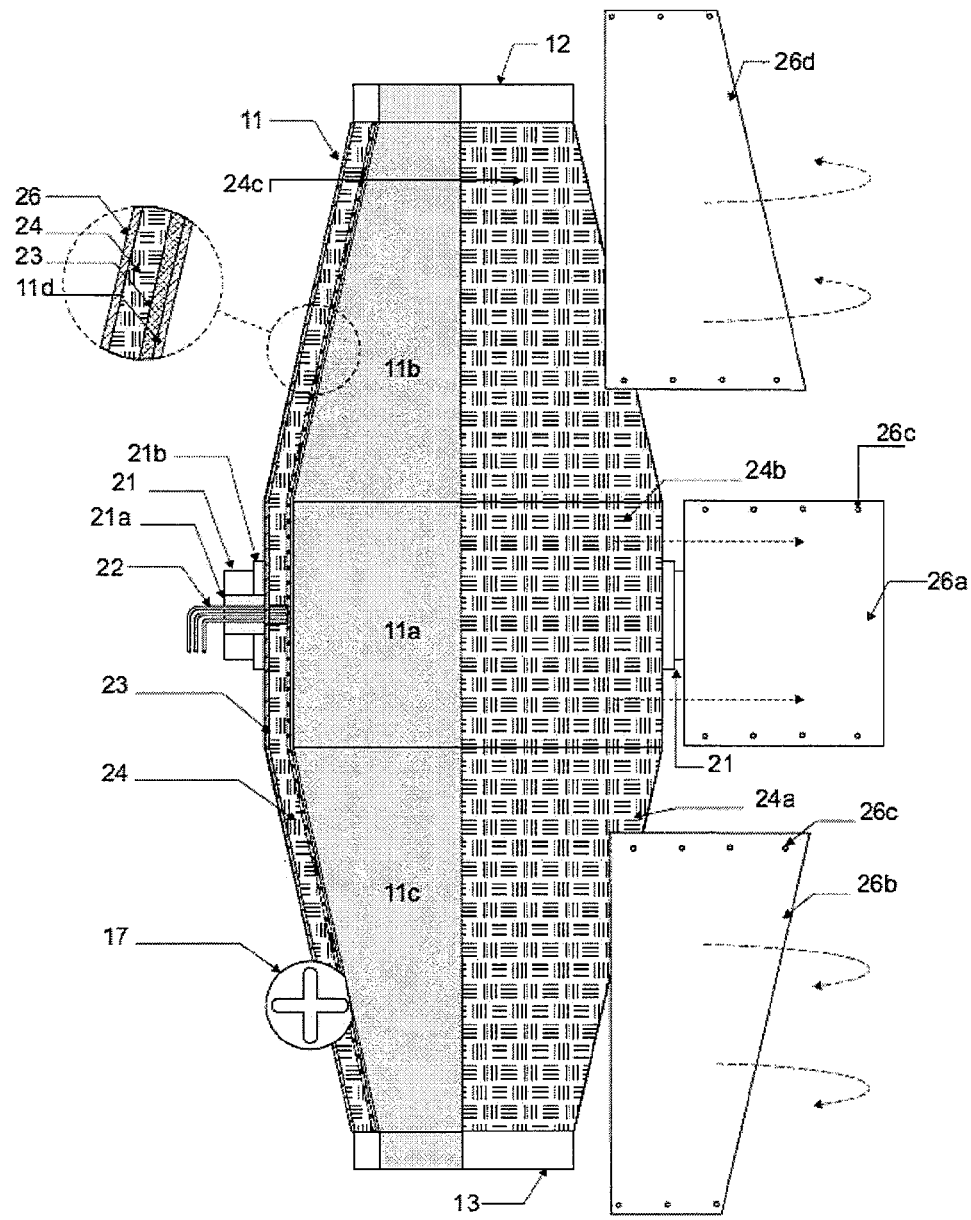
FIG. 10 shows the view of the rotary reactor that spins above a horizontal shaft as designed according to the specifications of the invention.

FIG. 10 shows the rotary reactor which rotates on a horizontal axis as designed by the invention. The reactor has a rhomboidal shape consisting of a cylindrical part in the middle (11a) allowing for the uniform distribution of heat in the reactor and a constant tumbling of its contents. On both ends of the horizontal rotary reactor (11) are two conical sections (11b and 11c), whose wider ends are closer to the cylindrical middle section of the reactor (11a) and become narrow out toward the two mouths or hatches at each end (12 and 13). The conical formation of the ends guarantees uniform movement of the grains inside the reactor during the cooking process as the reactor turns.

The horizontally rotating reactor (11) has a series of layered components. First, it has an inner steel container (11d) which comprises the tapered portion of the reactor with its polyhedron shape, and is open on both ends. Preferably, it is made in one piece, and since it should consist of angles greater than 90° between the cylindrical middle section of the reactor (11a) and each conical section (11b and 11c), there should not be spaces where bacteria can generate, and simultaneously makes cleaning the inside of the reactor easier. The inner stainless steel container (11d) (or made of austenitic steel) should be treated with a hard Teflon or ceramic coating, which has an advantage over other materials which are easily corroded by the maize grain cooking process and lime (CaO) used. The reactor is built in one single piece using a cast molding or welding process, which results in a construction free of internal edges and preferably with smooth outer surface (suitable for the application of resistors). In addition, two molds can be used in the construction of the inner steel container (11d) and these can be subsequently welded together using a polish to eliminate imperfections.

The next layer consists of resistors lined in silicon, kapton or mica (23). The inner steel container (11d) is lined by at least one layer of silicon, kapton, or mica-encased resistors, affixed to the outer surface of the inner steel container (11d) with vulcanized adhesive or glue. These type of resistors can be mounted to a flat surface (like that of the inner steel container (11d)), allowing the generated heat to transfer on contact to the entire length of the inner steel container (11d) or to any of the conical sections (11b and 11c) of same, as shown in the diagram.

It is worth noting that the resistors lined in silicon, kapton or mica can be manufactured according to the specifications of a particular section, meaning a single arrangement of resistors can be made to use as the lining for the inner steel container (11d). In other versions of the design, each cylindrical section of the reactor (11a), or any of the conical sections (11b and 11c) can have its own silicon, kapton or mica lining or more. The advantage of designing it this way is that each resistor can be replaced if it is defective.

This type of silicon, kapton or mica resistors are preferable due to their advantage of their direct contact with the inner steel container (11d). This direct contact with the steel rhombus prevents the generation of carbon dioxide or carbon monoxide to avoid burning fossil fuels and also better use of heat by direct contact. It is also worth noting that the easy manufacture of the silicon, kapton or mica-lined resistors allows the resistor arrangement to be changed, either by adding or removing resistors. This has different advantages: less silicon, kapton or mica lined resistors enables a simpler electronic control system or less components, while a greater number of silicon, kapton or mica-lined resistors enables other resistors in the arrangement to replace any that have gone bad. The diagram shows a reactor dressed in a resistor layer lined in a silicon, kapton or mica, which completely wraps around the inner steel container (11d). In another version, the silicon, kapton, and mica-lined resistors partially cover the inner steel container (11d). Other versions have silicon, kapton, or mica-encased resistors solely lining some parts of the reactor. Any of the aforementioned characteristics depend on the type of resistors used and the amount of heat transferred to each section of the inner steel container (11d). On the other hand, the resistors can be regulated by an electronic control system which supplies the current and voltages required by the silicon, kapton, or mica-lined resistors and at the same time, measure the amount of current consumed in order to detect any failed resistors in the system in the case of implementing multiple resistors. The silicon, kapton or mica-lined resistor(s) are connected to the electronic control system by serial or parallel ports, or connected to each resistor, depending on the requirements of the particular electromechanical nixtamalization system.

The silicon, kapton or mica-lined resistor(s) are connected by resistant or high-temperature resistant cables to the electronic control system, which regulates the operating times and outages. In another version, the silicon, kapton and mica-lined resistors are connected to an interrupter that contains a fuse in case of a power surge.

The inner steel container (11d) and the at least silicon, kapton or mica-lined resistor comprises an insulated lining (24) which is preferably of ceramic fiber. The advantage of using this type of ceramic fiber include low thermal conductivity, low storage temperature, reduction of energy consumption, reduction of operational costs, resistance to thermal shock, light-weightiness, and flexibility in the cooking cycles. This type of lining allows the heat to be insulated to prevent the waste of energy, making this an ecologically sound invention. The fiber encases the encases the entire lining of the inner steel container (11d) and the at least silicon, kapton or mica-lined resistor, minimizing heat loss. Optionally, the lining can be placed on individual sections (24a, 24b and 24c) according to the reactor's design.

The final or outer layer consists of detachable stainless steel plates (26a, 26b and 26d). They are detachable to enable corrective maintenance of any one of the resistors. FIG. 10 shows only part some of the plates that form the reactor's exterior. Nevertheless, the entire outer surface of the reactor is covered with such plates, as shown for the purpose of ensuring a longer usefulness by enabling the easy maintenance of the reactor in perfect condition by protecting its inner steel container (11d), the at least the silicon, kapton or mica-lined resistor (23), and the insulating lining (24) made of ceramic fiber. The outer layer is made of six or more steel casings featuring perforated (26c) to connect all the pieces. For horizontally rotating reactors (11) they can be used to protect the cylindrical and two conical sections joined together by screws. In another version, each cylinder and each of the two cones make up a series of plate sections as illustrated in FIG. 10 how four plates, for example can be used to cover any of the cones, and four for the cylinder part of the reactor. In other words, the plates can be cut, bent and screwed to the exterior of the reactor. In the version shown, the preferred configuration is a horizontally rotating reactor (11) encased by at least six stainless steel plates, which are hermetically sealed without any pressure or water leaks when closed by the mouth and hatches on both ends (12 and 13). The detachable stainless steel plates can be two plates covering both halves of the reactor, four which cover one quarter of the reactor, or six, or two per section, joined by components enabling the plates to be removed, such as by screws, enabling easy repair or replacement of parts without having to replace the entire reactor, but instead, only requiring one section of stainless steel plates to be removed to access the internal components for replacement or maintenance. Lastly, pertaining to the exterior plates, a high-resistant plastic or other suitable protective material can be used in place of steel due to the high insulation factor of the ceramic fiber lining.

The horizontally rotating reactor (11) has two horizontal outer bearings (21) which permit the reactor to rotate on a horizontal axis (11), and which have a base (21b) which affix the horizontally rotating reactor unit (11); and which have a hollow section (21a) to allow cables and hoses to be fed through it (22). These cables and hoses power the reactor and introduce pressure to the reactor for cooking the maize.

FIG. 10 also shows a cross-section of the horizontally rotating reactor (11) revealing the inner steel container (11d), resistor(s) (23) wrapped in silicon, kapton or mica and the insulated lining (24) of preferably ceramic fiber and detachable plates (26). As previously mentioned, two mouths or hatches on both ends (12 and 13) which serve to fill and empty the grains maintain constant internal pressure and is equipped with a relief valve. The two mouths or hatches on both ends (12 and 13) open in different ways depending on the function required by the operator of the system. For instance, one hatch can be restrained by a hinge, or by flaps or sliding brackets. In any case, the unit should be airtight with a high-temperature seal to prevent pressure and/cooking water from escaping.

Figure 11:
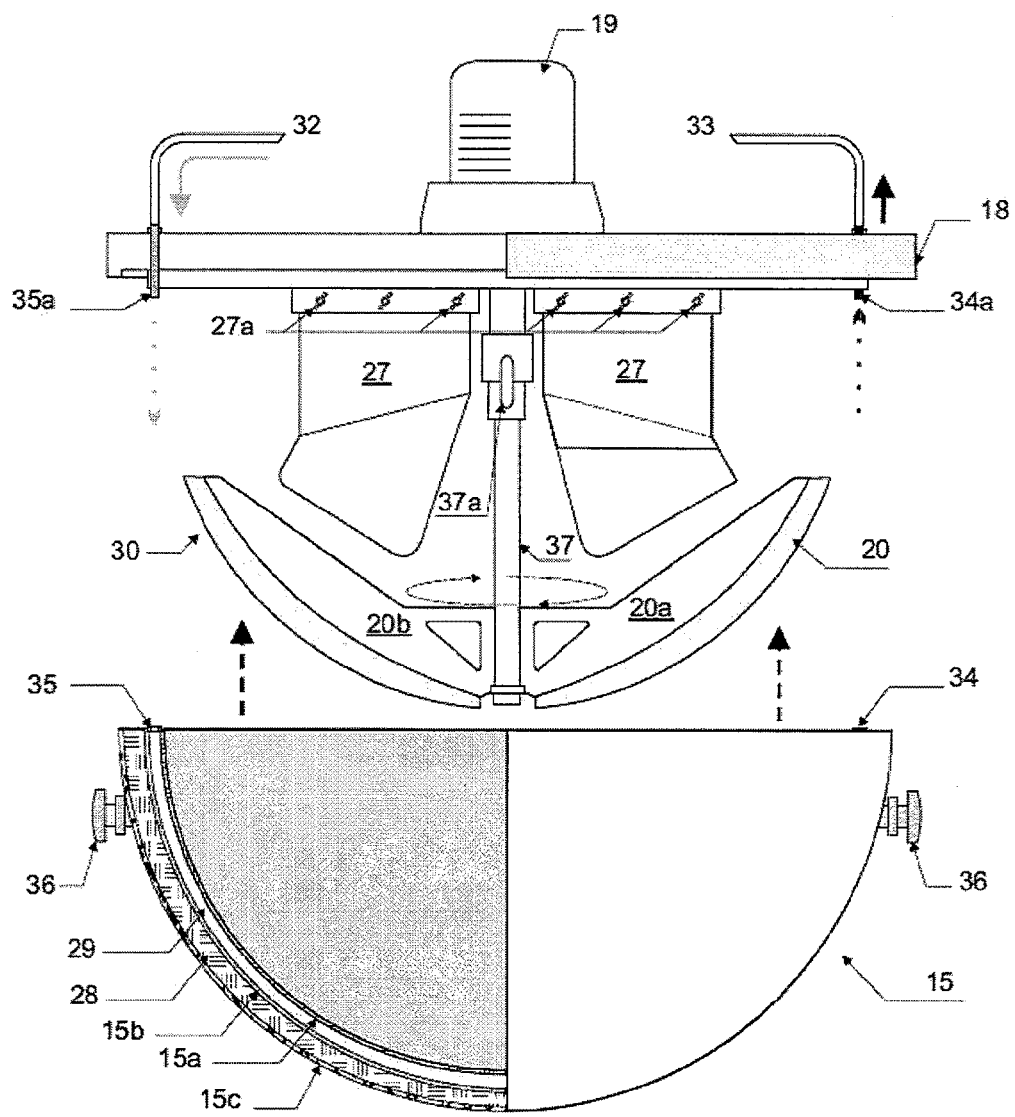
FIG. 11 shows a lateral view of the nixtamal cooling component as designed in accordance with the specifications of the invention.

FIG. 11 shows a lateral view of the nixtamal cooling vat (15) as designed according to the specifications of the invention. The same figure shows a left and right side view of the cooling vat. The cooling unit includes the vat (15) in a tub-shape with its interior (15a) and exterior (15c) ideally constructed out steel or aluminum. The interior that comes in contact with the product should be treated with hard Teflon or food-grade ceramic, or a corrosion-resistant material consisting of two horizontal shafts (36) that maintains the balance of the cooling vat (15) for emptying its contents. The cooling vat (15) has an inner (15a) and an intermediate surface (15b), both of which should be constructed out of the same material as the vat's exterior (15c). Between the inner surface (15a) and the intermediate surface (15b) is a cooling chamber (29) which should cover the entire surface area of the cooling vat (15). The interior surface (15a), cooling chamber (29) and intermediate surface (15b) are all lined with a material layer (28) preferably made out of polyurethane high-pressure foam, the advantage of which is it has a low thermal conductivity, low storage temperature, increasing cooling capacity, reducing operational costs, and is resistant to external blows, lightweight, permitting flexibility in the cooling process. The cooling vat (15) contains all the necessary components for the fluid to be able to circulate throughout the entire cooling chamber, such as an inlet (35) functionally connected to a pivot in the lid (35a) to permit the passage of a cooling fluid to the cooling chamber (29). The inlet (35) and lid pivot (35a) are functionally connected to prevent the cooling fluid that is circulating throughout the cooling chamber (29) from leaking, and similarly, in an outlet (34) functionally connected to the lid pivot (34a). The lid pivots (35a) and (34a) are connected to a cooling system by tubes for the fluid to circulate (32 and 33). The cooling system works by components for circulating water, which include a motor, a source of coolant, and other cooling components. In addition, the lid (18) is in contact with the entire upper surface of the cooling vat (15), the lid (18) consisting of a motor of removable plates (19), which supports the motion of the silicon blade(s) (30). Ideally, the blades are made of silicon (20a and 20b) and whose function is to move the still hot nixtamal, and whose movement is driven by the motor with removable plates (19) attached to a vertical shaft (37) which can be removed from the coupling (37a) to be cleaned. The purpose of the lid and tub is to facilitate rapid cooling of the nixtamal to reduce the time it takes for it to be ready to grind. The cooling vat (15) is raised vertically to meet the lid (18). The inlet (35), outlet (34), lid pivots (35a) and (34a) together create an airtight unit to allow the circulation of the coolant. The lid (18) consists of blades (27) affixed to the bottom of the lid (18) that are flexible to permit the movement of the silicon blades (20a and 20b). The flexible blades (27) are affixed to the bottom of the lid (18) by screws (27a) (preferably butterfly screws for easy removable of the blades for cleaning). The silicon blades (20a and 20b), being a functional unit with the lid (18) assist in the uniform movement of the nixtamal, thereby thoroughly cooling the contents. Optionally, the cooling chamber may contain an inner coil which preferably is in contact with the interior surface (15a) to enable better heat transfer. In this type of cooling process, the coil allows the coolant to circulate constantly until the nixtamal is cooled. Optionally, the unit can also include a filling and emptying system, whereby the cooling chamber (29) can be filled with a low-temperature solution, and once it absorbs the heat of the nixtamal, it can be emptied and refilled until the nixtamal is cooled enough to be ground. The coolant to be used is preferably brine or saline solution that complies with food-grade standards, but other types of cooling fluids can be used according to the specifications of this invention.

Figure 12:
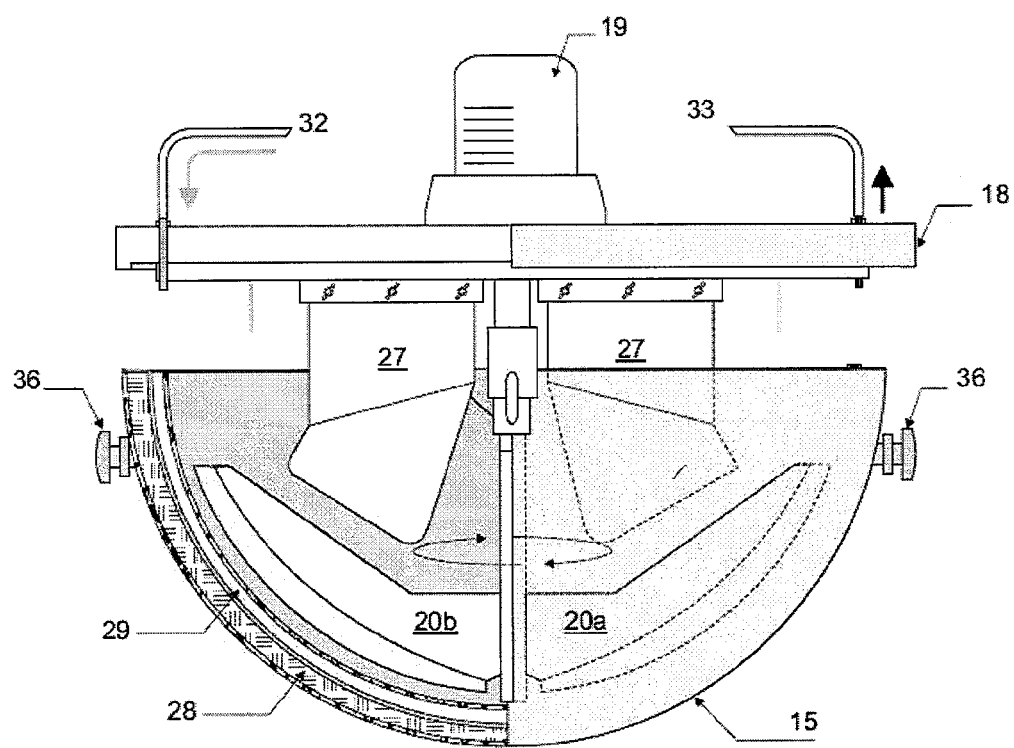
FIG. 12 shows the lateral view of the nixtamal cooling component with agitators partially inside the vat.

FIG. 12 shows a lateral view of the nixtamal cooling system with the agitators inside the vat. The same components described in FIG. 11 can be found in FIG. 12 and the silicon blades (20a and 20b) are likewise shown here inside the cooling vat (15). In FIG. 12 one can observe the interaction of the silicon blades (20a and 20b) with the other components, resulting in the uniform cooling of the nixtamal product.

Finally, this invention refers to an electromechanical nixtamalization system but this invention is also patented for similar variations of the same concept.

The invention claimed is:

1. An electromechanical nixtamalization system comprising:
   a reactor mounted on a pedestal and rotatable about a horizontal axis, the reactor comprising an inner steel container, at least one resistor, an coating of ceramic fiber, and one or more exterior plates;
   a fill system operable to introduce maize grains to the reactor;
   a cooling vat, separate from and disposed below the reactor, and a cooling vat lid, the cooling vat comprising:
      an inner surface, an intermediate surface, and an exterior surface;
      a cooling chamber located between the inner surface and intermediate surface;
      a high-pressure polyurethane foam between the intermediate surface and the exterior surface; and
   a pressure tank adjacent to the reactor, operable to adjust pressure within the reactor using a piston compressor.

2. The electromechanical nixtamalization system of claim 1, wherein the reactor further comprises two horizontal shafts, an axle box, a plurality of ball bearings, a plurality of gears, a motor, and a power supply, the power supply including at least one resistor and a pressure control operable to adjust the pressure within the reactor via the adjacent pressure tank.

3. The electromechanical nixtamalization system of claim 1, wherein the fill system comprises one of a suction motor, a pneumatic propulsion, or a conveyor system, and a filter.

4. The electromechanical nixtamalization system of claim 1, wherein the adjacent pressure tank one of a control panel or an electronic control system operable to control a valve.

5. The electromechanical nixtamalization system claim 1, wherein the cooling vat lid comprises a cooling agitator motor operable to move at least one agitator, the at least one agitator having one or more plates.

6. The electromechanical nixtamalization system of claim 1, wherein the fill system further comprises:
   an upper hopper located above the reactor, the upper hopper being funnel-shaped; and
   a lower hopper located approximate to the reactor, the lower hopper coupled with a water uptake system operable to receive water from a solar-heated tank, and a water/lime uptake system operable to receive a water/lime solution from a water/lime dispenser.

* * * * *